United States Patent
Freyermuth et al.

(10) Patent No.: US 9,079,256 B2
(45) Date of Patent: Jul. 14, 2015

(54) TOOL HOLDER EQUIPPED WITH A DAMPING MEANS AND COMPRISING A DEVICE FOR PREVENTING EXCESSIVE HEATING OF THE DAMPING MEANS

(75) Inventors: Alain Freyermuth, Pfaffenhoffen (FR); Matthieu Ostermann, Allenwiller (FR); Cedric Roos, Neuwiller les Saverne (FR)

(73) Assignee: SECO-E.P.B., Bouxwiller (FR)

( * ) Notice: Subject to any disclaimer, the term of this patent is extended or adjusted under 35 U.S.C. 154(b) by 803 days.

(21) Appl. No.: 13/170,254

(22) Filed: Jun. 28, 2011

(65) Prior Publication Data

US 2011/0318127 A1 Dec. 29, 2011

(30) Foreign Application Priority Data

Jun. 28, 2010 (FR) .................................... 10 55169

(51) Int. Cl.
*B23C 5/00* (2006.01)
*B23B 31/02* (2006.01)
*B23B 31/117* (2006.01)

(52) U.S. Cl.
CPC ................. *B23C 5/003* (2013.01); *B23B 31/02* (2013.01); *B23B 31/1179* (2013.01); *B23B 2250/16* (2013.01); *B23C 2250/16* (2013.01); *Y10T 82/2595* (2015.01); *Y10T 279/17957* (2015.01); *Y10T 408/76* (2015.01); *Y10T 409/304312* (2015.01)

(58) Field of Classification Search
CPC ............... B23C 5/003; B23Q 11/0032; B23Q 11/0035; B23Q 11/0039; Y10T 409/304312; Y10T 408/76; Y10T 279/17957; Y10T 279/3493

USPC ........... 409/141, 234; 408/143; 279/102, 103, 279/157
See application file for complete search history.

(56) References Cited

U.S. PATENT DOCUMENTS

| 3,447,402 | A | | 6/1969 | Ray |
| 3,774,730 | A | * | 11/1973 | Maddux ........................ 188/379 |
| 3,838,936 | A | | 10/1974 | Andreassen et al. |
| 4,061,438 | A | * | 12/1977 | New .............................. 408/143 |
| 4,364,293 | A | * | 12/1982 | Hirsch ............................ 83/674 |
| 5,413,318 | A | | 5/1995 | Andreassen |
| 6,443,673 | B1 | | 9/2002 | Etling et al. |
| 2008/0290613 | A1 | * | 11/2008 | Haimer ......................... 279/2.02 |
| 2009/0003947 | A1 | | 1/2009 | Haimer et al. |
| 2009/0257838 | A1 | | 10/2009 | Ostermann et al. |

FOREIGN PATENT DOCUMENTS

| EP | 0 571 490 | 1/1995 |
| EP | 1 084 782 | 3/2001 |

(Continued)

OTHER PUBLICATIONS

French Search Report dated Feb. 10, 2011, corresponding to the French Priority Application.

*Primary Examiner* — Daniel Howell
*Assistant Examiner* — Michael Vitale
(74) *Attorney, Agent, or Firm* — Young & Thompson

(57) ABSTRACT

A tool holder (1) in the form of a boring head, a chuck, a milling cutting arbor, or the like, is equipped with a damping element (2) in the form of an elongated body that is arranged in an end housing (3) of the tool holder (1), with corresponding shape and size. The tool holder that is characterized in that it includes a device (4) for preventing excessive heating of the damping element (2). The tool holder is more particularly applicable in the field of numerically-controlled machine tool accessories, machining centers, and flexible cells and workshops.

20 Claims, 3 Drawing Sheets

FOREIGN PATENT DOCUMENTS

Figure 1:
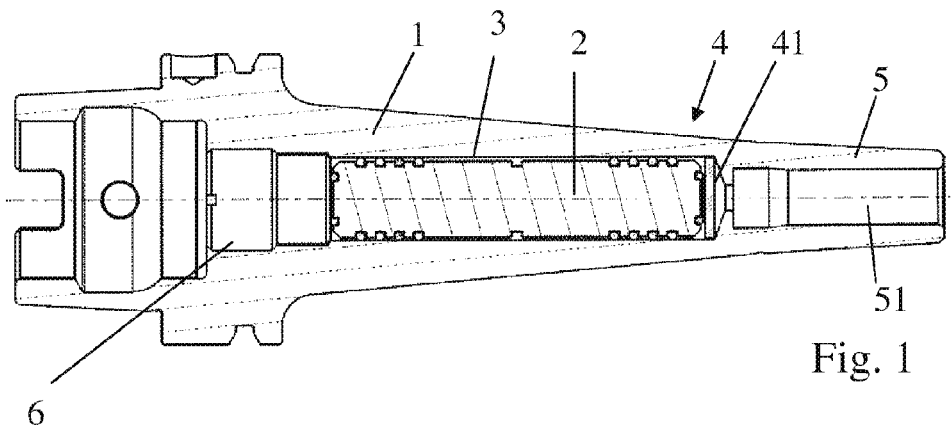

| | | |
|---|---|---|
| EP | 1 248 692 | 10/2002 |
| FR | 2 173 957 | 10/1973 |
| FR | 2 929 868 | 10/2009 |
| JP | 57 149108 | 9/1982 |
| WO | WO 2008002145 A1 * | 1/2008 .............. B23B 29/02 |

* cited by examiner

TOOL HOLDER EQUIPPED WITH A DAMPING MEANS AND COMPRISING A DEVICE FOR PREVENTING EXCESSIVE HEATING OF THE DAMPING MEANS

BACKGROUND OF THE INVENTION

This invention relates to the field of numerically-controlled machine tool accessories, machining centers, and flexible cells and workshops, and it has as its object a tool holder that is equipped with a damping means and that comprises a device for preventing excessive heating of the damping means.

DESCRIPTION OF THE RELATED ART

The tool holders have a tendency, from the very fact of their composition, to vibrate, which is detrimental to their proper operation. This tendency to vibrate is all the more significant since the actual operating speeds of the machine tools are increasing constantly.

To prevent these drawbacks, it was proposed to equip the tool holders with a device for damping oscillations, making possible an adaptation of their rigidity to the operating conditions.

For this purpose, devices that essentially consist of a damping mass mounted in an axial housing and held in the latter by acting on the ends are currently known from U.S. Pat. No. 3,447,402, FR-A-2 173 957, EP-A-0 571 490 and EP-A-1 248 692.

Furthermore, a tool holder that is provided with a damping means in the form of an elongated body placed in a tool-holder end housing, whereby this damping means is of the type with radial absorption only and its ends extend in the housing without constraint, is known from FR-A-2 929 868. It is thus possible to cancel out the vibrating effects due to shearing forces and to machining speeds with a tool holder of simple design and implementation.

The mounting of the cutting tools on the tool holders is currently performed more and more often by clamping, i.e., by preliminary heating of the end of the tool holder that accommodates the cutting tool and by installing and positioning the tool, generally by means of an automatic machine.

This mounting by clamping leads to a significant heating of the corresponding end of the tool holder. The result is that the entire front part of said tool holder is heated and that all of the constituent elements of this front part undergo a strong rise in temperature. Such a rise in temperature can have negative effects on the elastic elements that equip the damping mass, however, namely deterioration of mechanical characteristics of these elastic elements, and even destruction of the latter.

SUMMARY OF THE INVENTION

This invention has as its object to remedy these drawbacks by proposing a tool holder that is equipped with a damping means, which is protected against excessive heating during the mounting of a tool by clamping.

For this purpose, the tool holder, such as a boring head, a chuck or milling cutting arbor, which is equipped with a damping means in the form of an elongated body that is arranged in an end housing of the tool holder, with a corresponding shape and size, is characterized in that it comprises a device for preventing excessive heating of the damping means.

BRIEF DESCRIPTION OF THE DRAWING FIGURES

Figure 2:
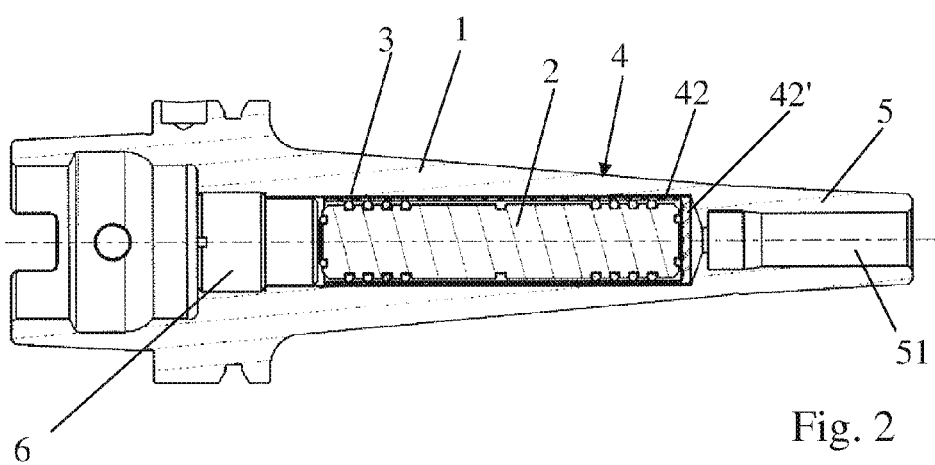
Figure 3:
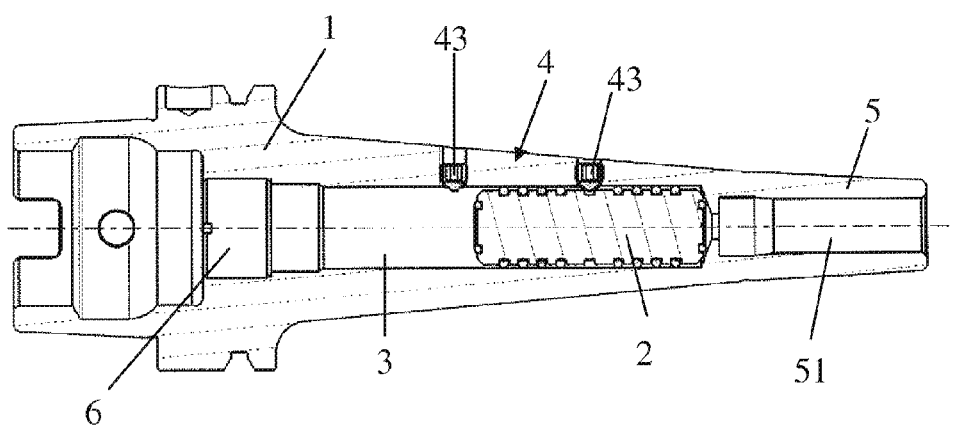
Figure 4:
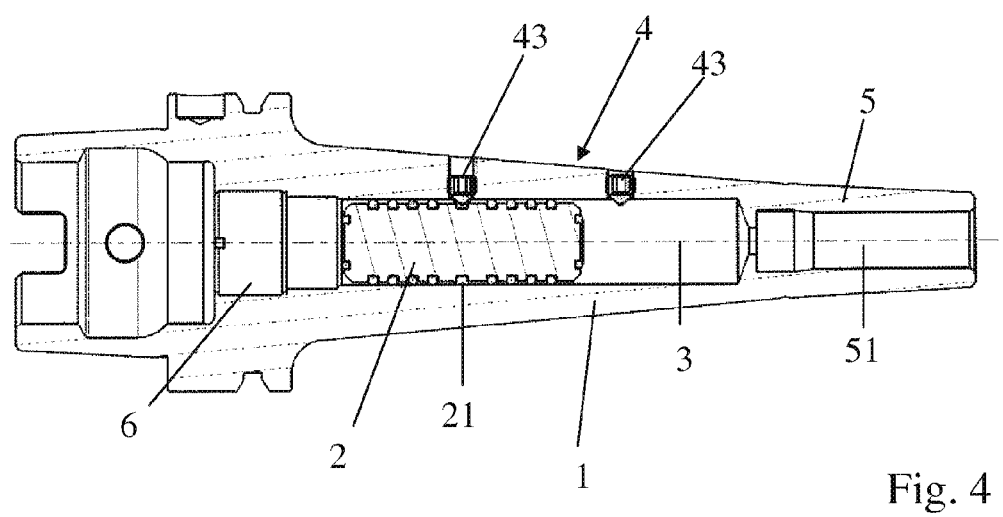
Figure 5:
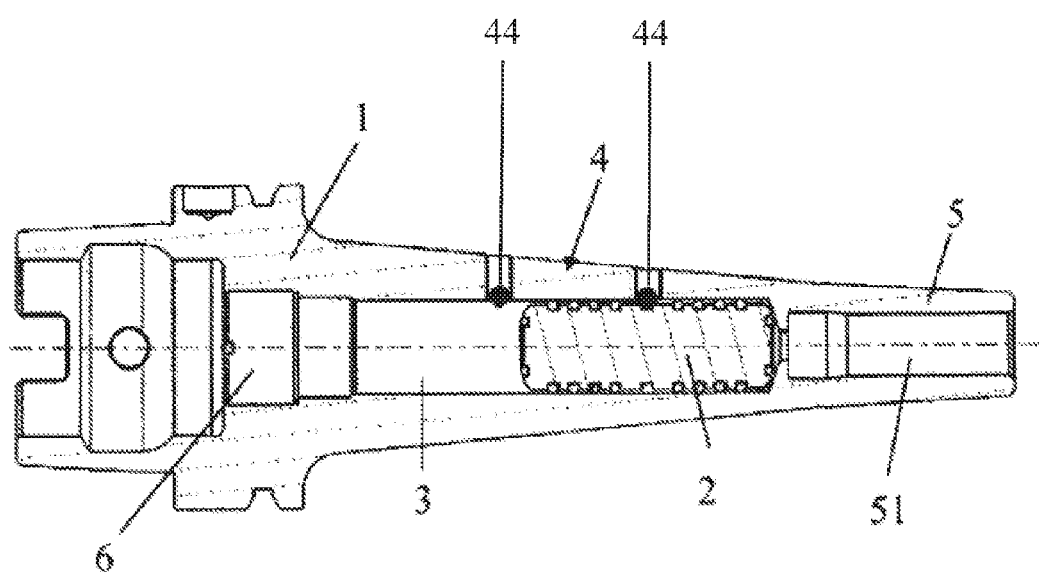

The invention will be better understood, using the description below, which relates to preferred embodiments, provided by way of nonlimiting examples and explained with reference to the accompanying diagrammatic drawings, in which:

FIG. 1 is a longitudinal cutaway view of a tool holder that is equipped with a damping means and that comprises a device for prevention again excessive heating according to the invention;

FIG. 2 is a view that is analogous to that of FIG. 1 of a first variant embodiment of the invention, FIGS. 3 and 4 are views that are analogous to those of FIGS. 1 and 2 of a second variant embodiment of the invention, respectively of a working position after clamping of a tool and of a position for preventing excessive heating during clamping, and FIG. 5 is a view showing a variant with retractable balls.

DETAILED DESCRIPTION OF THE INVENTION

FIGS. 1 to 3 of the accompanying drawings show, by way of examples, a tool holder in the form of a boring head 1, which is provided with a damping means 2 in the form of an elongated body that is arranged in an end housing 3 of the tool holder 1, with corresponding shape and size.

According to the invention, the tool holder 1 comprises a device 4 for preventing excessive heating of the damping means 2.

In a known manner, the elongated body that forms the damping means 2 is arranged in the end housing 3 close to the sleeve 5 for accommodating a boring head, a milling cutting arbor or the like.

In the embodiments shown in the accompanying drawings, the damping means 2 is of the type with radial absorption only and is provided with at least one elastically deformable means, at least close to each end, whereby said elastically deformable means extend between the casing of the damping means 2 and the wall of the housing 3 of the tool holder by being clamped between the wall of the housing 3 and the damping means 2.

According to a first embodiment of the invention, the device 4 for preventing excessive heating of the damping means 2 advantageously consists of a heat-insulating buffer 41 that extends in front of the end of the damping means 2 from the side of the latter located close to the sleeve 5 for accommodating a boring head, a milling cutting arbor or the like. Such a heat-insulating buffer 41 can consist of any material that has a high insulation coefficient, namely, for example, based on glass fibers that are immersed in a resin or else based on mica and resin. Thus, during heating, for the purpose of clamping the tool previously centered on the sleeve 5, a relatively significant portion of the released heat is transmitted to the sleeve 5 and by the latter to the tool-holder unit 1, in such a way that heating of the housing 3 of the damping means 2 also occurs.

The provision of the heat-insulating buffer 41 that forms the device 4 makes it possible to insulate said housing 3 against the heat that is obtained directly from the sleeve 5 and more particularly the heat in the form of very hot air that is found in the central hole 51 of said sleeve 5.

It follows that the elements of the damping means 2, namely the elastically deformable parts that are used for damping, are protected against excessive heating.

FIG. 2 of the accompanying drawings shows a variant embodiment of the invention, in which the device 4 for preventing excessive heating of the damping means 2 consists of a receptacle 42 for housing the damping means 2, whereby this receptacle is inserted into the housing 3 of the tool holder 1 and is closed by a wall 42' at least on one side rotated toward the sleeve 5 for accommodating a boring head, a milling cutting arbor or the like.

In this embodiment, the receptacle 42 is also advantageously made of a material with a high heat-insulating power.

FIGS. 3 and 4 of the accompanying drawings show a second variant embodiment of the invention, in which the device 4 for preventing excessive heating of the damping means 2 essentially consists of the provision of a housing 3 of the damping means 2 with a length that is greater than the length of said damping means 2, whereby the prevention of excessive heating is implemented by moving the damping means 2 from one operating position (FIG. 3), in which the damping means 2 is placed and is held at one end of the housing 3, close to the sleeve 5 for accommodating a boring head, a milling cutting arbor or the like, to a position for preventing the heating in which the damping means 2 is placed and is held at the opposite end of the housing 3.

Holding the damping means 2 in its two end positions can be ensured by means of two pressure screws 43 that work, each in one of the positions of the damping means 2, with a circular median groove 21 of said damping means 2.

This holding of the damping means 2 in its two end positions can also be ensured by a device with two retractable balls 44 that work—each in one of the positions of the damping means 2—with the circular median groove 21 of said damping means 2. Such a device is schematically shown in FIG. 5.

As FIGS. 1 to 4 of the accompanying drawings show, the damping means 2 is mounted in the housing 3 of the tool holder 1 by the rear surface of the latter, i.e., on the side opposite to the sleeve 5 for accommodating a boring head, a milling cutting arbor or the like, and is held in said housing 3 by means of a plug 6.

It is also possible, according to another characteristic of the invention, not shown in the accompanying drawings, to carry out the mounting of the damping means 2 in the tool holder 1 by its front surface, with it being held securely in place by means of a plug that is also introduced by its front surface.

In such a case, the plug for closing the housing 3 can simultaneously constitute an additional device for preventing excessive heating of the damping means 2.

Owing to the invention, it is possible to produce a tool holder that is equipped with a damping means and that comprises a device for preventing excessive heating of said damping means making possible the implementation of clamped tools, while preserving the fragile portions of the damping means 2, in particular the elastically deformable elements, against deterioration due to the heat that is released during the clamping.

Of course, the invention is not limited to the embodiments that are described and shown in the accompanying drawings. Modifications are possible, in particular from the standpoint of the composition of the various elements or by substitution of equivalent techniques, without thereby exceeding the field of protection of the invention.

The invention claimed is:

1. A tool holder, comprising:
an outer first part (1) having a rear end and an opposite front end, the front end having a sleeve (5) that accommodates one of a group consisting of a boring head, and a milling cutting arbor;
an end housing (3) within the outer first part;
a damping means (2) in the form of an elongated body, the damping means (2) being arranged in the end housing (3) and having a shape and a size corresponding to a shape and a size of the end housing, the damping means (2) having a first end towards the front end of the outer first part and a second end towards the read end of the outer first part; and
a device (4) for preventing excessive heating of the damping means (2), the device (4) being positioned between first end of the damping means (2) and the sleeve (5) such that the device (4) for preventing excessive heating provides a shield that covers an entirety of the first end of the damping means (2) in a plane perpendicular to a longitudinal axis of the tool holder at the first end of the damping means (2).

2. Tool holder (1), according to claim 1, wherein the device (4) for preventing excessive heating of the damping means (2) consists of a heat-insulating buffer (41) that extends in front of the end of the damping means (2) from the side of the latter located closest to the sleeve (5).

3. Tool holder (1), according to claim 2, wherein the damping means (2) is mounted in the end housing (3) of the tool holder (1) by the rear surface of the latter, on the side that is opposite to the sleeve (5) and is held in said end housing (3) by means of a plug (6).

4. Tool holder (1), according to claim 2, wherein the damping means (2) is mounted in the tool holder (1) by its front surface, with it being held securely in place by means of a plug that is also introduced by its front surface.

5. Tool holder (1), according to claim 1, wherein the device (4) for preventing excessive heating of the damping means (2) consists of a receptacle (42) for housing the damping means (2), whereby this receptacle is inserted into the end housing (3) of the tool holder (1) and is closed by a wall (42') at least on its side that is rotated toward the sleeve (5).

6. Tool holder (1), according to claim 5, wherein the damping means (2) is mounted in the end housing (3) of the tool holder (1) by the rear surface of the latter, on the side that is opposite to the sleeve (5) and is held in said end housing (3) by means of a plug (6).

7. Tool holder (1), according to claim 5, wherein the damping means (2) is mounted in the tool holder (1) by its front surface, with it being held securely in place by means of a plug that is also introduced by its front surface.

8. Tool holder (1), according to claim 1, wherein the damping means (2) is mounted in the end housing (3) of the tool holder (1) by the rear surface of the latter, on the side that is opposite to the sleeve (5), and is held in said end housing (3) by means of a plug (6).

9. Tool holder (1), according to claim 1, wherein the damping means (2) is mounted in the tool holder (1) by its front surface, with it being held securely in place by means of a plug that is also introduced by its front surface.

10. Tool holder (1), according to claim 1, wherein,
the outer first part (1) with the sleeve (5) has a longitudinal axis,
the end housing (3), the damping means (2) and the sleeve are aligned with each other and the longitudinal axis,
the device (4) for preventing excessive heating of the damping means (2) is positioned between the damping means (2) and the sleeve (5) and is aligned with the longitudinal axis,
the device (4) being one of another group consisting of
i) a heat-insulating buffer (41) that extends in front of an end of the damping means (2) from a side of the damping means (2) closest to the sleeve (5), the heat-insulating buffer (41) insulating said end housing (3) against heat obtained directly from the sleeve (5), and ii) a receptacle (42) that houses the damping means (2), the receptacle located within the end housing (3) and closed by a wall (42') positioned between a) an end of the damping means (2) closest the sleeve (5) and b) the sleeve (5).

11. Tool holder (1), according to claim 1, wherein, the outer first part (1) with the sleeve (5) has a longitudinal axis, the end housing (3), the damping means (2) and the sleeve are aligned with each other and the longitudinal axis, the device (4) for preventing excessive heating of the damping means (2) is positioned between the damping means (2) and the sleeve (5) and is aligned with the longitudinal axis, the device (4) is a heat-insulating buffer (41) that extends in front of an end of the damping means (2) from a side of the damping means (2) closest to the sleeve (5), the heat-insulating buffer (41) comprising a material of glass fibers immersed in a resin, the heat-insulating buffer (41) insulating said end housing (3) against heat obtained directly from the sleeve (5).

12. Tool holder (1), according to claim 1, wherein, the outer first part (1) with the sleeve (5) has a longitudinal axis, the end housing (3), the damping means (2) and the sleeve are aligned with each other and the longitudinal axis, the device (4) for preventing excessive heating of the damping means (2) is positioned between the damping means (2) and the sleeve (5) and is aligned with the longitudinal axis, the device (4) is a receptacle (42) that houses the damping means (2), the receptacle located within the end housing (3) and closed by a wall (42') positioned between a) an end the damping means (2) closest the sleeve (5) and b) the sleeve (5).

13. A tool holder, comprising:

an outer first part (1) with a sleeve (5) that accommodates one of a group consisting of a boring head, and a milling cutting arbor;

an end housing (3) within the outer first part;

a damping means (2) in the form of an elongated body, the damping means (2) being arranged in the end housing (3) and having a shape and a size corresponding to a shape and a size of the end housing; and a device (4) for preventing excessive heating of the damping means (2), wherein, a length of the end housing (3) is greater than a length of said damping means (2), and the prevention of excessive heating is carried out by a movement of the damping means (2) from i) an operating position, in which the damping means (2) is placed and is held at one end of the end housing (3), near the sleeve (5), to ii) a position for preventing the heating in which the damping means (2) is placed and is held at the opposite end of the end housing (3).

14. Tool holder (13), according to claim 13, wherein the holding of the damping means (2) in its two end positions is ensured by means of two pressure screws (43) that work—each in one of the positions of the damping means (2)—with a circular median groove (21) of said damping means (2).

15. Tool holder (1), according to claim 14, wherein the damping means (2) is mounted in the end housing (3) of the tool holder (1) by the rear surface of the latter, on the side that is opposite to the sleeve (5) and is held in said end housing (3) by means of a plug (6).

16. Tool holder (1), according to claim 13, wherein the holding of the damping means (2) in its two end positions is ensured by a device with two retractable balls that work—each in one of the positions of the damping means (2)—with a circular median groove (21) of said damping means (2).

17. Tool holder (1), according to claim 16, wherein the damping means (2) is mounted in the end housing (3) of the tool holder (1) by the rear surface of the latter, on the side that is opposite to the sleeve (5) and is held in said end housing (3) by means of a plug (6).

18. Tool holder (1), according to claim 13, wherein the damping means (2) is mounted in the end housing (3) of the tool holder (1) by the rear surface of the latter, on the side that is opposite to the sleeve (5) and is held in said end housing (3) by means of a plug (6).

19. Tool holder (1), according to claim 13, wherein the damping means (2) is mounted in the tool holder (1) by its front surface, with it being held securely in place by means of a plug that is also introduced by its front surface.

20. A tool holder (1), comprising:

an outer first part (1) with a sleeve (5) that accommodates a boring head;

a housing (3) within the outer first part;

a damping means (2) having an elongated body, the damping means (2) being arranged in the housing (3), a length of the housing (3) being greater than a length of the damping means (2); and a device (4) for preventing excessive heating of the damping means (2), wherein the prevention of excessive heating is carried out by a movement of the damping means (2) from i) a first operating position in which the damping means (2) is placed and is held at a first end of the housing (3) near the sleeve (5), to ii) a second position for preventing the heating in which the damping means (2) is placed and is held at an opposite second end of the housing (3).

\* \* \* \* \*